US005865018A

United States Patent [19]
Wanie

[11] Patent Number: 5,865,018
[45] Date of Patent: Feb. 2, 1999

[54] CUTTER BLADE REMOVAL TOOL

[75] Inventor: Todd R. Wanie, Horicon, Wis.

[73] Assignee: Scag Power Equipment, Inc., Mayville, Wis.

[21] Appl. No.: 792,963

[22] Filed: Jan. 24, 1997

[51] Int. Cl.$^{6}$ ............................ A01D 55/18; B23P 19/00; B23P 19/04; B23Q 3/00

[52] U.S. Cl. ................................ 56/17.4; 29/240; 29/283; 81/488

[58] Field of Search ........................ 29/283, 240; 30/151, 30/164, 329, 334, 337, 339; 81/488; 56/17.4, DIG. 24, DIG. 20

[56] References Cited

U.S. PATENT DOCUMENTS

| | | | |
|---|---|---|---|
| 1,459,028 | 6/1923 | Lindell | 30/334 |
| 2,164,050 | 6/1939 | Brown | 30/151 |
| 3,047,946 | 8/1962 | Lins | 30/339 X |
| 3,173,234 | 3/1965 | Vodinelich | 56/17.4 X |
| 3,191,648 | 6/1965 | Dustrude | 30/151 X |
| 3,757,407 | 9/1973 | Bomar | 29/240 X |
| 4,564,991 | 1/1986 | Taylor | 29/283 X |
| 4,854,044 | 8/1989 | Collins | 30/151 |
| 4,882,960 | 11/1989 | Kugler | 29/283 X |

*Primary Examiner*—Joseph M. Gorski
*Attorney, Agent, or Firm*—Michael Best & Friedrich LLP

[57] ABSTRACT

A tool for removing a lawn mower cutter blade from a shaft to which it is attached by a threaded member and disposed in a cutter deck having a skirt portion which surrounds the cutter blade and having different portions disposed at different distances from the ends of the cutter blade as the cutter blade rotates. The tool includes a sleeve portion having open opposite ends and adapted to be telescopically received over the end of the blade and a stop disposed intermediate the ends of the sleeve portion for engaging one end of the blade to limit the extent to which the tool can move inwardly toward the center of the blade so that a portion of the tool extends from the end of the blade toward the skirt portion, whereby when one end of the tool is received on a cutter blade and the blade is rotated, the other end of the tool jams against the inner surface of the skirt portion so that the threaded member can be threaded on or removed from the shaft without further rotation of the blade.

5 Claims, 2 Drawing Sheets

Fig. 4
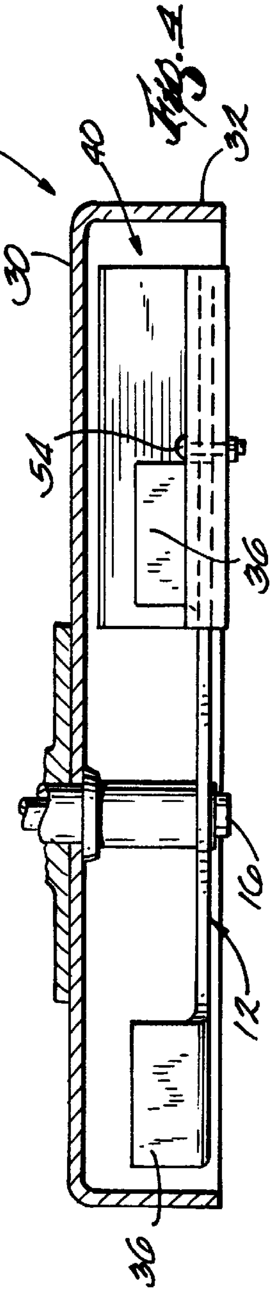
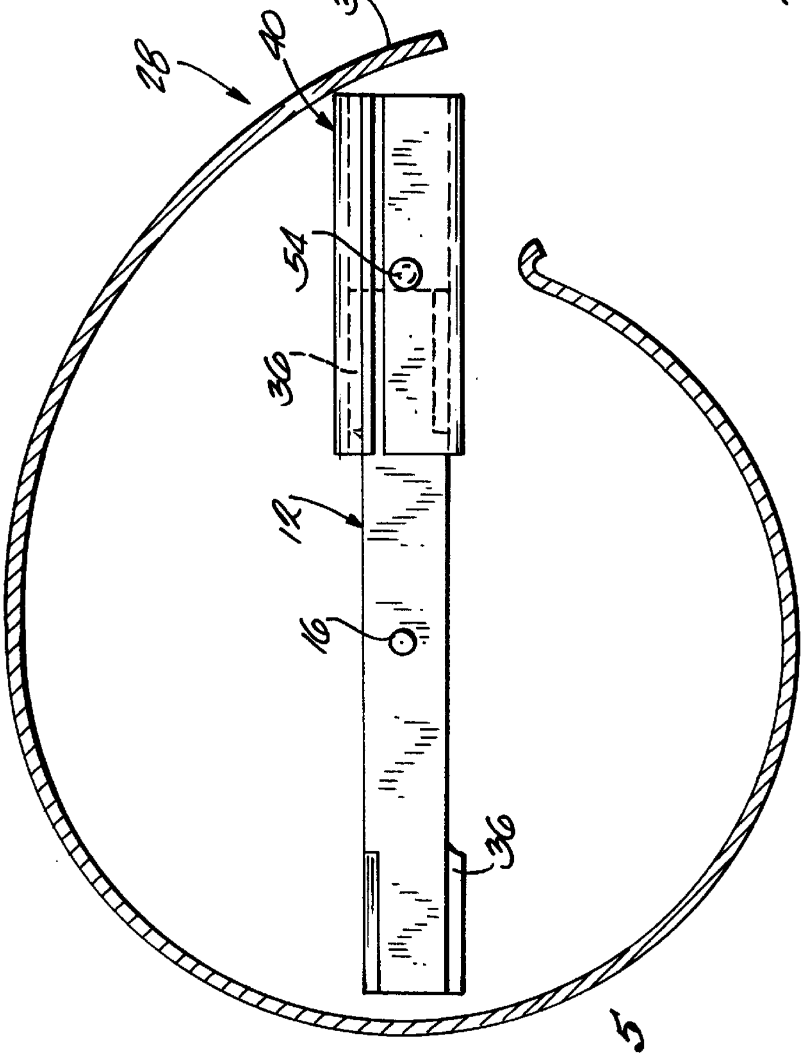
Fig. 5

CUTTER BLADE REMOVAL TOOL

BACKGROUND OF THE INVENTION

This invention relates to hand tools and more particularly to a tool for removing lawn mower cutter blades.

Lawn mower cutter blades generally comprise a generally flat elongate member having a cutting edge adjacent each end and on the opposite sides. Such cutter blades normally have a center opening for being attached to a spindle shaft by a bolt which is threadably received in a bore formed in the end of the shaft. In order to securely attach the blade to the shaft, it is necessary to apply a relatively high torque when tightening or loosening the bolt. The application of such high torque forces has a tendency to rotate the blade and drive shaft. For this reason, it is necessary to attempt to hold the blade in some fashion to prevent rotation when the blade is being attached or removed.

SUMMARY OF THE INVENTION

It is an object of the invention to provide a new and improved tool for holding a lawn mower cutter blade during attachment or removal.

A further object of the invention is to provide a tool which prevents a lawn mower cutter blade from rotating during removal or reattachment.

These and other objects and advantages of the present invention will become more apparent from the detailed description thereof taken with the accompanying drawings.

In general terms, the invention comprises a tool for removing a lawn mower cutter blade from the shaft to which it is attached by a threaded member. The cutter blade is disposed in a cutter deck having a skirt portion which surrounds the cutter blade and has portions disposed at varying distances from the ends of the cutter blade as the cutter blade rotates. The tool includes a sleeve portion having open opposite ends and adapted to be telescopically received over one end of the cutter blade, stop means disposed intermediate the ends of the sleeve portion for engaging one end of the blade to limit the extent to which the tool may move inwardly towards the center of the blade so that a portion of the tool extends from the end of the blade toward the skirt portion, whereby when one end of the tool is received on a cutter blade and the blade is rotated, the other end of the tool jams against the inner surface of the skirt portion so that further rotation of the cutter blade is prevented while the threaded member is removed from the shaft.

According to another aspect the invention comprises a method of removing a lawn mower cutter blade attached to the end of a shaft by a threaded member and disposed in a cutter deck having a skirt portion surrounding the cutter blade and having portions disposed at varying distances from the outer end of the cutter blade as the cutter blade is rotated by the shaft. The method comprises the steps of providing a tool member which is elongate and open at its opposite ends, mounting one open end of the tool member over one end of the cutter blade and positioning the tool such that a first portion of the tool extends over a portion of the cutter blade inwardly from one end thereof and a second portion of the tool extends longitudinally from the end of the cutter blade towards the skirt portion, rotating the blade about the axis of the shaft until the end of the tool displaced from the blade jams against the inner surface of the skirt portion, and removing the threaded member from the shaft with the blade being prevented from rotating as a result of the jamming action of the tool against the skirt portion.

BRIEF DESCRIPTION OF THE DRAWINGS

FIGS. 4 and 5 illustrate how the tool is employed for removing or mounting a lawn mower cutter blade.

DETAILED DESCRIPTION OF THE PREFERRED EMBODIMENT

Figure 1:
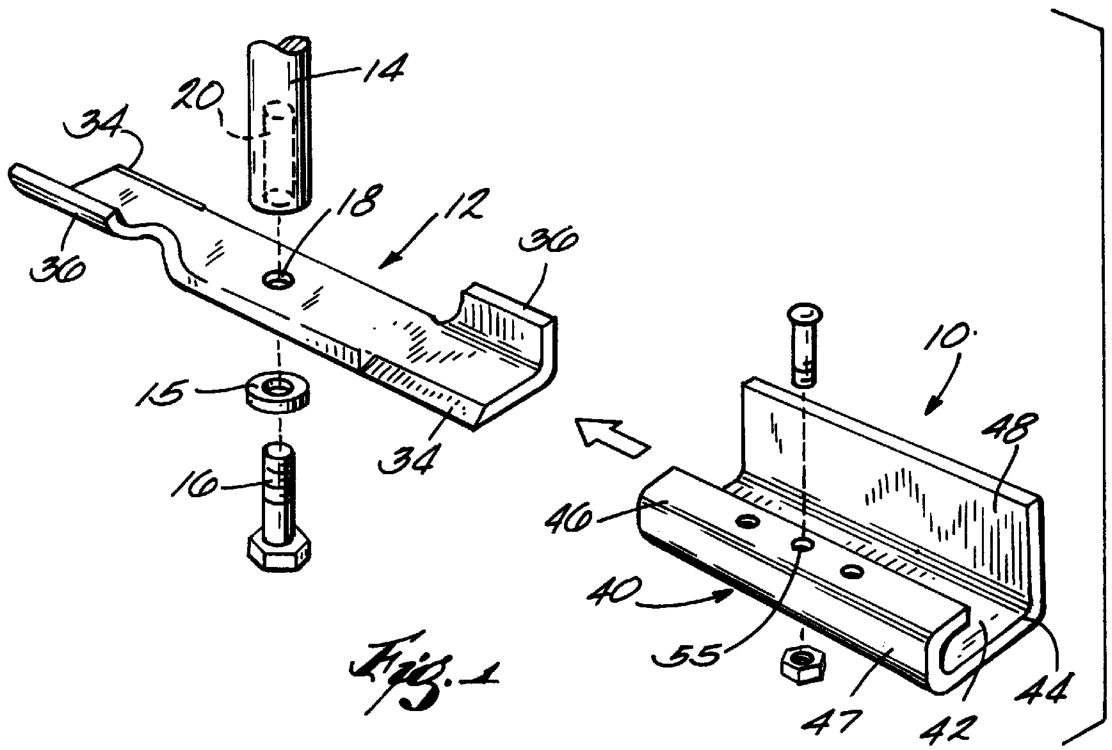
FIG. 1 is a perspective view showing the lawn mower cutter blade removal tool according to the preferred embodiment of the invention.
Figure 2:
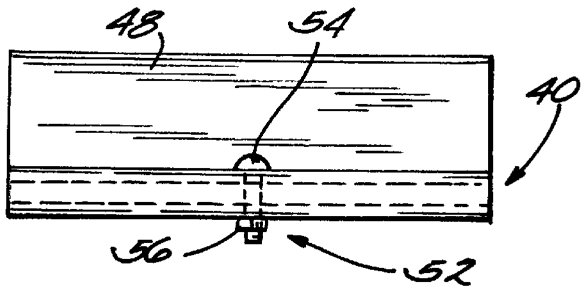
FIG. 2 is a front view thereof.
Figure 3:
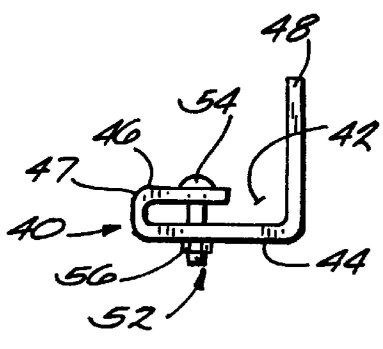
FIG. 3 is a side view thereof.

FIGS. 1–3 show a tool 10 for mounting a lawn mower cutter blade 12 on or removing the blade from a spindle shaft 14. Those skilled in the art will appreciate that the cutter blade is connected to an engine or other power source by means of a belt drive or gear train. The blade 12 is secured on the shaft 14 by any suitable threaded member. In the illustrated example, this comprises a washer 15 and a bolt 16 which extends through a center opening 18 in blade 12 and is received in an axial threaded bore 20 in the end of shaft 14. Other types of threaded members, such as through bolts may also be provided.

The cutter blade 12 of a lawn mower is typically disposed in a cutter deck 28 which shields the operator from the rotating blade. Typically, the cutter deck has a top portion 30 and a skirt 32 which extends downwardly along the edges of the top portion 30. As seen in FIG. 4, the skirt 32 is non-symmetrical so that various portions of the skirt 32 are normally located at different distances from the ends of the blade 12 as the blade rotates.

A lawn mower cutter blade such as that shown in FIG. 1 typically comprises a generally flat bar having a cutting edge 34 adjacent its ends with one being on each of its opposite sides. Integral fins 36 may be formed adjacent each end of the blades and on the side opposite the cutting edges 34 for creating an air stream and for projecting the grass clippings upwardly so that they may be discharged more readily from the cutter deck 30.

In the preferred embodiment, the tool 10 includes a sleeve portion 40 which is open at its opposite ends and is configured to be received over the end of the cutter blade 12. A slot 42 is provided in the tool 12 for receiving the fin 36 of the blade 12 as the tool 10 is positioned.

While the tool 10 may be formed in any suitable manner, in the illustrated embodiment it consists of a member which is formed to define a generally planer base 44 and a top wall 46 that is generally parallel to the base 44 and spaced from the base a distance slightly greater than the thickness of the blade 12 to define the open ended sleeve portion 40. A front wall 47 joins the base 44 and the upper wall 46. A rear wall 48 extends upwardly from the opposite side of the base 44 and is spaced from the inner edge of the top wall 46 to define the slot 42. The angle formed by the wall 48 and the base 44 should be sufficient to permit the fins 36 to enter the slot 42. A stop 52 is provided intermediate the ends of tool 10. In the illustrated embodiment, the stop 52 comprises a bolt 54 which extends through aligned holes 55 in the base 44 and top 46 and is secured by a nut 56. A plurality of holes 55 may be provided so that the position of the stop 52 can be adjusted relative to either end of the tool.

When it is desired to remove the blade 12 from the shaft 14, one end of the tool is slipped over either end of the blade 12. Assume that the blade is to be removed. The threads on the bolt 16 and the bore 20 are cut so that the bolt tends to tighten as the shaft 14 rotates. Thus as the blade rotates in a clockwise direction as viewed in FIG. 1 the nut 22 must be rotated in a counter-clockwise direction for removal. As a result, the tool 10 is slipped over the right end of the blade as viewed in FIG. 1 until the end of the blade engages the stop 52. A wrench is then applied to the bolt 16 and counter-clockwise torque is applied causing slight counter-clockwise rotation of the blade 12 until the outer end of the tool 10 jams against the skirt 32 as seen in FIG. 5. The application of further torque loosens the bolt 16 without further rotation of the blade 12. When the blade is reattached, the tool 10 is similarly mounted on either end of the blade and the bolt 16 threaded into the shaft bore 20. When torque is applied to the bolt 16 for final tightening, the end of the tool 10 will again jam against the skirt 32 so that the tightening torque can be applied without the blade rotating.

While only a single embodiment of the invention as has been illustrated and described, it is not intended to be limited thereby but only by the scope of the appended claims.

I claim:

1. The combination of a lawn mower and a removal tool, the lawn mower including cutter blade, a shaft, a threaded member for connecting the cutter blade to the shaft, a cutter deck having a skirt portion which surrounds the cutter blade and has different portions disposed at different distances from the ends of the cutter blade as the cutter blade rotates, said tool including an elongate sleeve portion having open opposite ends and defining an interior space, the width of the space in a transverse section being several times larger than the height for receiving said cutter blade, said sleeve portion having a complementary cross-sectional configuration to that of the cutter blade, said interior space being sized so that each open end is telescopingly receivable over the end of the cutter blade, a stop extending into the interior space intermediate the ends of the sleeve portion for engaging one end of the cutter blade to limit the extent to which the tool can move inwardly toward the center of the blade, the length of the sleeve portion being greater than the distance between the stop and the end of the cutter blade so that a portion of the tool extends from the end of the blade toward the skirt portion, whereby when the cutter blade is rotated, the other end of the tool jams against the inner surface of the skirt portion so that the threaded member can be threaded on or removed from the shaft without further rotation of the cutter blade.

2. The combination set forth in claim 1 wherein said sleeve portion includes a base, an upper wall portion spaced from the base, a front side extending between the base and the upper wall portion and a rear wall spaced from the front wall, the rear wall being spaced from the front wall a distance several times greater than the distance between the base and the upper wall.

3. The combination set forth in claim 2 wherein the upper wall is spaced from the rear wall to define a slot for receiving a portion of a cutter blade, the rear wall extending at an acute angle from the base.

4. The combination set forth in claim 3 and including means for repositioning the stop at a plurality of longitudinal locations relative to the opposite ends of the sleeve for adjusting the length of the portion of the tool extending from the end of the blade.

5. The combination set forth in claim 4 wherein said stop comprises a member extending between said upper wall portion and said base and through said space, said means for repositioning said stop comprising a plurality of holes in said upper wall portion and said base.

* * * * *